(12) United States Patent (10) Patent No.: US 9,353,294 B2
Fleming et al. (45) Date of Patent: May 31, 2016

(54) MICROSTRUCTURED RELEASE LINERS

(75) Inventors: Danny L. Fleming, Stillwater, MN (US); Frank T. Sher, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 1223 days.

(21) Appl. No.: 11/011,444

(22) Filed: Dec. 14, 2004

(65) Prior Publication Data

US 2006/0127626 A1 Jun. 15, 2006

(51) Int. Cl.
| | |
|---|---|
| *B05D 1/32* | (2006.01) |
| *C09J 7/02* | (2006.01) |
| *B29C 59/02* | (2006.01) |
| *B29C 35/08* | (2006.01) |
| *B29C 59/04* | (2006.01) |

(52) U.S. Cl.
CPC ............ *C09J 7/0232* (2013.01); *B29C 59/022* (2013.01); *B29C 35/0805* (2013.01); *B29C 35/0866* (2013.01); *B29C 59/04* (2013.01); *B29C 2059/023* (2013.01); *C09J 2400/226* (2013.01); *C09J 2400/283* (2013.01); *C09J 2483/005* (2013.01); *Y10T 428/14* (2015.01)

(58) Field of Classification Search
USPC ............ 156/277, 272.2, 272.8; 427/466, 470, 427/487, 510, 511, 516, 541; 3/277, 272.2, 3/272.8
See application file for complete search history.

(56) References Cited

U.S. PATENT DOCUMENTS

| | | | |
|---|---|---|---|
| 4,965,126 A * | 10/1990 | Abraham et al. ............. | 428/343 |
| 5,141,790 A | 8/1992 | Calhoun | |
| 5,296,277 A | 3/1994 | Wilson | |
| 5,362,516 A | 11/1994 | Wilson | |
| 5,527,578 A | 6/1996 | Mazurek | |
| 5,560,796 A * | 10/1996 | Yoshimura ............. | 156/240 |
| 5,591,786 A | 1/1997 | Oxman | |
| 5,635,545 A | 6/1997 | Oxman | |
| 5,858,545 A | 1/1999 | Everaerts | |
| 5,897,930 A | 4/1999 | Calhoun | |
| 5,985,982 A * | 11/1999 | Shipston et al. ............. | 524/515 |
| 6,007,914 A | 12/1999 | Joseph | |

(Continued)

FOREIGN PATENT DOCUMENTS

| | | | |
|---|---|---|---|
| JP | 59053787 A | * | 3/1984 |
| JP | 62258773 A | * | 11/1987 |

(Continued)

OTHER PUBLICATIONS

English translation of JP 59-053787, see above for date and inventor.*

(Continued)

*Primary Examiner* — Victor Chang
(74) *Attorney, Agent, or Firm* — Jeffrey M. Olofson

(57) ABSTRACT

The present application is directed to an article comprising a base substrate having a first major surface and a second major surface opposite the first major surface and a structured surface comprising a deposited material adhered to a portion of the first major surface of the base substrate, wherein the material has a height over the first major surface of at least 3 micrometers. The structured surface is defined, in part, by the deposited material and the structured surface has at least one continuous structure from one edge of the base substrate to a second edge of the base substrate. The application is additionally directed to a method of manufacturing the article.

11 Claims, 1 Drawing Sheet

(56) References Cited

U.S. PATENT DOCUMENTS

| | | | | |
|---|---|---|---|---|
| 6,113,149 | A | * | 9/2000 | Dukatz ............................ 283/91 |
| 6,197,397 | B1 | | 3/2001 | Sher |
| 6,616,993 | B2 | * | 9/2003 | Usuki et al. ................. 428/32.79 |
| 2001/0031353 | A1 | * | 10/2001 | Hannington ................... 428/343 |
| 2003/0236318 | A1 | * | 12/2003 | Kitano et al. ................. 522/109 |

FOREIGN PATENT DOCUMENTS

| | | | |
|---|---|---|---|
| JP | 02057345 A | * | 2/1990 |
| JP | 2002-363515 | | 12/2002 |
| WO | WO 98/29231 | | 7/1998 |
| WO | WO 98/29516 | | 7/1998 |
| WO | WO 99/65999 | | 12/1999 |
| WO | WO 00/02966 | | 1/2000 |
| WO | WO 02/13980 | | 2/2002 |
| WO | WO 2005/075592 | | 8/2005 |
| WO | WO 2005/075593 | | 8/2005 |

OTHER PUBLICATIONS

English abstract of JP 02-057345, see above for date and inventor.*
English Abstract of JP 62-58773, see above for date.*

* cited by examiner

MICROSTRUCTURED RELEASE LINERS

FIELD

The present application is directed to carrier webs, especially release liners.

BACKGROUND

Pressure sensitive adhesives are useful for the joining of two materials. The interfaces between the adhesive and the materials are vital to the performance of the joined materials. The loss of adhesion at either interface can doom the usage of the materials. Adhesives have been structured in the past for various reasons.

Several approaches to structuring adhesives are known, including those shown in, for example, U.S. Pat. Nos. 5,296,277 and 5,362,516 (both Wilson et al.); U.S. Pat. No. 5,141,790 and U.S. Pat. No. 5,897,930 (both Calhoun et al.); and U.S. Pat. No. 6,197,397 (Sher et. al). These patents disclose how the structure in the adhesive is built from the interface between the adhesive and the release liner.

These release liners are generally manufactured by structuring a thermoplastic polymer surface of the liner. Current methods of making release liners having microstructured patterns include cast extrusion onto a microstructured tool that imparts the desired pattern to the liner followed by silicone release coating where required, or by pressing a pattern into a thermoplastic polymer surface, with or without a silicone release coating, between structured nips to impart a pattern. These manufacturing steps form the topography on the liner, which is then used to impart topography into an adhesive. These steps require durable patterned tools, appropriate equipment, and materials suitable for these processes that can provide stable topography for further processing and use.

SUMMARY

Liners with thermoplastic polymer surfaces may have process limitations. For example, it may be undesirable to process a thermoplastic polymer surface liner above the softening point for the polymer. In some embodiments, the methods discussed above require heated processing. Additionally, the tooling used in the processes discussed above is expensive to create and difficult to replace. Therefore, it has been difficult to make a variety of patterns available on one manufacturing line. It is desirable to have a liner that does not require a complete thermoplastic polymer surface, durable and special patterned tools, process limitations for the liner material, and specific liner materials that result in robust topography.

In one embodiment, the application is directed to an article comprising a base substrate having a first major surface and a second major surface opposite the first major surface and a structured surface comprising a deposited material adhered to a portion of the first major surface of the base substrate, wherein the material has a height over the first major surface of at least 3 micrometers. The structured surface is defined, in part, by the deposited material and the structured surface has at least one continuous structure from one edge of the base substrate to a second edge of the base substrate.

In another embodiment, the application is directed to an adhesive article comprising
a base substrate having a first major surface and a second major surface opposite the first major surface, a material deposited on a portion of the first major surface of the base substrate to form a pattern on the base substrate, and an adhesive layer deposited on a portion of the first major surface of the sheet over the deposited material. The pattern formed in the base substrate is operatively adapted so as to form air egress channels in a bonding surface of the pressure sensitive adhesive, and upon removal from the sheet and the deposited material, the adhesive has a pattern the inverse of the pattern formed by the deposited material, and when the pressure sensitive adhesive is applied to said microstructured release surface, such that the air egress channels define a microstructured bonding surface having exit pathways for air to bleed out from under the article when the article is adhered to a substrate.

The application is additionally directed to a method of manufacturing an article comprising providing a base substrate having a first major surface and a second major surface opposite the first major surface, and depositing a material on least a portion of the first major surface of the base substrate as a defined pattern. The defined pattern comprises at least one continuous structure from one edge of the base substrate to a second edge of the base substrate.

The material can be deposited by screen printing the material on the first major surface of the sheet, by gravure printing the material on the first major surface of the sheet, by ink-jet printing the material on the first major surface of the sheet, and by thermography printing. The method may additionally comprises exposing the article to thermal processing, electromagnetic radiation or particle radiation after depositing the material on the first major surface of the sheet.

In certain embodiments, the method comprises coating an adhesive layer over the deposited material, to create an adhesive article

DETAILED DESCRIPTION

Figure 1:
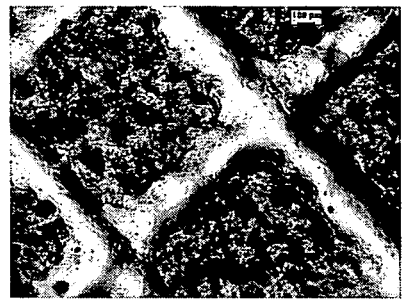
FIG. 1 is a digital images of the sample prepared in Example 3.

The article of the present application is manufactured using a variety of methods. Generally, a base substrate is provided. A depositing material is then deposited onto a first major surface of the base substrate, forming a structured surface comprising a deposited material. For the purpose of the present application, a depositing material is in a form capable of being deposited. The deposited material is the material in its final form, on the substrate. The material may be deposited onto a textured surface or on a flat surface of the base substrate.

The material is deposited using various techniques, including printing techniques. Examples of printing techniques include, for example, screen printing (including rotary), gravure printing, thermography printing, flexographic printing, intaglio printing, and inkjet printing. Generally, the deposited material creates a predetermined structure. The structure creates a structured surface on the base substrate. In certain embodiments, the structured surface has at least one continuous structure from one edge of the base substrate to a second edge of the base substrate.

In certain embodiments, the article is subjected to post-depositing processing. Post-depositing processing may include one or more of thermal, electromagnetic radiation (for example ultraviolet light, visible light and microwave), and particle radiation (for example e-beam exposure). In some instances, post-depositing processing cures, dries, fuses or solidifies the deposited material to make a structure capable of maintaining its shape over a variety of processing and handling conditions. In other embodiments, post-depositing processing may increase the profile of the deposited material. For example, exposure to thermal energy may cause the deposited material to expand.

The structures may have a height over the base substrate of greater than about 3 micrometers, for example greater than about 5 micrometers and in specific embodiments greater than about 7 micrometers. In some embodiments, the height of the structures is less than about 45 micrometers, for example less than 35 micrometers and in specific embodiments less than about 25 micrometers. The structures may have a width less than about 300 micrometers, for example less than about 200 micrometers and in specific embodiments less than about 150 micrometers. The structures may have a width greater than about 15 micrometers, for example greater than about 25 micrometers and in specific embodiments greater than about 50 micrometers.

In certain embodiments, the structure is a defined pattern comprising at least one continuous structure from one edge of the base substrate to a second edge of the base substrate. The pattern may be regular or irregular, linear or wavy, and may form any shape, for example, arrays of triangles, squares, rectangles, diamonds, hexagons, or combinations of shapes. The pitch, defined as the distance between the center points of adjacent shapes, is generally greater than about 150 micrometers, for example greater than about 170 micrometers and in specific embodiments, greater than about 200 micrometers. The pitch is generally less than 5100 micrometers, for example less than about 2500 micrometers and in specific embodiments, the pitch is less than about 1700 micrometers.

In some embodiments, the article with the deposited material, or the post-processed deposited material, is then coated with a release coating.

A structured adhesive layer is then created by contacting an adhesive with the structured surface of the article, forming an adhesive article. The adhesive may contact the structured surface by, for example, coating a composition (e.g. an adhesive composition in solution, a composition as a dispersion or a hot melt composition) or laminating an existing adhesive layer. In embodiments where the article was coated with a release coating, the adhesive layer exists over any release coating. The structure on the base substrate imparts a structure into one major surface of the adhesive layer. The structure in the adhesive results in a pattern formed so as to form air egress channels in a bonding surface of the pressure sensitive adhesive. For example, upon removal from the base substrate, the adhesive has a structure pattern the inverse of the structure pattern formed by the deposited material, and when the structured surface of the adhesive is applied to a surface, the air egress channels define a microstructured bonding surface having exit pathways for air to bleed out from under the adhesive layer when the structured surface of the adhesive is adhered to a substrate.

Any material suitable as a carrying web would be suitable for the base substrate of the present invention. Examples include, papers and polymeric films, including plastics. The base substrate may be single or multiple layer. Specific examples include, polyester (for example polyethylene terephthalate), polypropylene (including cast and biaxially oriented polypropylene), and papers (including clay coated paper). In some embodiments, the liner is a polyethylene coated paper or a polyethylene coated poly(ethylene terephthalate) film.

In some embodiments, the substrate has at least one major surface that has a flat surface. In other embodiments, the substrate has a major surface with a structured surface. In some embodiments, the structured surface may be a texture, such as a random roughness, random pattern of shapes, an ordered roughness or an ordered pattern of shapes.

In certain embodiments, the base substrate is not conformable. In such embodiments, nothing on the base substrate can be modified by, for example, embossing.

In some embodiments, the base substrate may be primed or treated to enhance adhesion of the deposited material and the resulting structure. Examples of such treatments include, for example, corona, flame, plasma and chemical treatments.

Suitable depositing materials include materials that, when deposited, create a profile above the sheet. Materials are deposited when its mass is transferred to the base substrate.

In some embodiments, the depositing materials may be made from monomers, oligomers, or polymers, solvent based or aqueous based solutions or mixtures and mixtures thereof. Generally, the material is a liquid at room temperature. For some processes, the liquid is preferably a viscous composition. The material may also be a thermally softenable or liquefiable composition that may be deposited while heated to a sufficient temperature. The depositing material may also be in a powder form.

In some embodiments, a liquid carrier may be used as part of the depositing material as long as the depositing material structure does not flow too much prior to post-drying of the material. The liquid carrier may be organic or aqueous, and in some embodiments it is a solvent.

In specific embodiments, the material is a chemically curable material, which may be post processed by, for example, polymerization, cross-linking, or both after it is deposited to make a robust final structure. Specific examples include curable inks, curable (meth)acrylates, (meth)acrylate functional materials, curable vinyl ethers, curable unsaturated materials, epoxide functional materials and curable silicones.

In other embodiments, the depositing material may provide release properties in the resulting structure. Specific examples include polydiorganosiloxane polyurea copolymers and blends thereof, such as those described in U.S. Pat. No. 6,007,914; and radiation curable release coating compositions containing organopolysiloxanes, as shown in U.S. Pat. Nos. 5,527,578 and 5,858,545.

In other embodiments, the depositing material is a powdered material, for example coalescing powders which may be fused by thermal post processing.

In other embodiments, a first depositing material is used to provide the pattern and is generally a liquid material, and a second material, which is applied onto the first to provide topography is a thermoplastic powder, which is fused by a thermal process. The second material may also be radiation curable.

Additives may be added to the depositing material to control viscosity, such as silicas, clays, and resins such as vinyl resins (for example those sold under the tradename UCAR™), acrylic resins (for example those sold under the tradenames, ACRYLOID™, PARALOID™, and ELVACITE™ types), polyester co-resins and modified ureas. Aqueous viscosity modifiers include cellulose ethers, hydrophobically modified cellulose ethers, hydroxyalkyl celluloses, cellulose complexes, polysaccharides, agar, alkali soluble polymers, alkali swellable polymers, nonionic types, nonionic urethanes, alkali swellable emulsion polymers, hydrophobically modified alkali swellable polymers, and carboxyl functional polymers.

Additionally, additives may be included to impart releasability from an adhesive. Examples include silicones, radiation curable silicones, such as those shown in U.S. Pat. No. 5,527,578, and other reactive silicones, such as those shown in publication WO/00/02966. Other additives may be included to enhance the bond between the deposited material to the base substrate. Other additives include dispersants, colorants, catalysts and surface tension modifiers.

In other embodiments, additives control expansion of the deposited material, for example blowing agents. Examples of blowing agents include physical blowing agents, such as volatile liquids or compressed gases; microsphere encapsulated physical blowing agents, such as those sold under the tradename EXPANCEL™ (available from Akzo Nobel Company; Duluth, Ga.); thermally activated chemical blowing agents, such as ammonium salts, bicarbonates, carbonates (e.g. sodium bicarbonate, ammonium carbonate and ammonium bicarbonate), N-nitroso compounds (e.g. N,N'-dinitrosopentamethlyenetetramine and N,N'-dimethyl-N,N'-dinitrosoterephthalamide), sulfonyl hydrazides (e.g. p-toluenesulfonyl hydrazide, benzenesulfonyl hydrazide, benzene-1,3-disulfonyl hydrazide, 4,4'-oxybis(benzenesulfonyl hydrazide)), azo compounds (e.g. azodicarbonamide, azobisisobutyronitrile, diazoaminobenzene), sulfonyl semicarbazides (e.g. p-toluenesulfonyl semicarbazide), 5-phenyltetrazole, diissopropylhydrazodicarboxylate, and 5-phenyl-3,6-dihydro-1,3,4-oxadiazin-2-one; other chemical blowing agents such as sodium borohydride (activated by water or acid proton source); and thermoset blowing agents (e.g. chemical blowing agent+peroxide+metal catalyst).

The structure comprising the deposited material is capable of maintaining its shape over a variety of processing and handling conditions and use as a release liner for adhesives. Generally, the deposited material may have a Young's modulus of greater than about 1 MPa.

In certain embodiments, the deposited material is resistant to solvent coating processes that may be used in release layer coating and adhesive coating. In some embodiments, the deposited material is resistant to thermal processing in later processing. Generally, the deposited material is resistant to thermal processing at temperatures in excess of 200° C. Additionally, the deposited material is robust for storage, handling and processing and durability of final product.

In some embodiments, the deposited material is not conformable. For example, the deposited material is not modified by, for example, thermal embossing.

The adhesive may be any adhesive suitable for an intended use, for example hot melt, heat activatable and pressure sensitive adhesives. The adhesive is generally a pressure sensitive adhesive. Pressure sensitive adhesives are generally characterized by their properties. Pressure sensitive adhesives are well known to one of ordinary skill in the art to possess properties including the following: (1) aggressive and permanent tack, (2) adherence to an adherend with no more than finger pressure, (3) sufficient ability to hold onto an adherend, and (4) sufficient cohesive strength to meet the needs of an intended application. Many pressure sensitive adhesives must satisfy these properties under an array of different stress rate conditions.

Any suitable pressure sensitive adhesive composition can be used for this invention. The pressure sensitive adhesive component can be any material that has pressure sensitive adhesive properties. Furthermore, the pressure sensitive adhesive component can be a single pressure sensitive adhesive or the pressure sensitive adhesive can be a combination of two or more pressure sensitive adhesives.

Pressure sensitive adhesives useful in the present invention include, for example, those based on natural rubbers, synthetic rubbers, styrene block copolymers, polyvinyl ethers, poly(meth)acrylates (including both acrylates and methacrylates), polyolefins, and silicones. The pressure sensitive adhesive may be aqueous or solvent based, a hot melt type, or a 100% solids coatable type.

The pressure sensitive adhesive may be inherently tacky. If desired, tackifiers may be included in the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, and curing agents.

Other additives may be included in the pressure sensitive adhesive to optimize the characteristics of the pressure sensitive adhesive such as fillers, additives to increase cohesive strength and tack reducing additives.

In a preferred embodiment, the pressure sensitive adhesive is based on at least one poly(meth)acrylate (e.g. is a (meth)acrylic pressure sensitive adhesive). Poly(meth)acrylic pressure sensitive adhesives are derived from, for example, at least one alkyl(meth)acrylate ester monomer such as, for example, isooctyl acrylate, isononyl acrylate, 2-methyl-butyl acrylate, 2-ethyl-hexyl acrylate and n-butyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, or combinations thereof. Preferably, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition, preferably isooctyl acrylate. A preferred embodiment for the present invention is derived from between about 2 and about 10 weight percent acrylic acid and between about 90 and about 98 weight percent of at least one of isooctyl acrylate, 2-ethyl-hexyl acrylate or n-butyl acrylate composition. One specific embodiment for the present invention is derived from about 2 weight percent to about 10 weight percent acrylic acid, and about 90 weight percent to about 98 weight percent of isooctyl acrylate.

In another embodiment, the adhesive is derived from between about 94-98 weight percent of isooctyl acrylate, 2-ethyl hexyl acrylate, n-butyl acrylate, or 2-methyl butyl acrylate and 2-6 weight percent (meth)acrylamide.

The adhesive can be solvent coated, for example in aqueous or organic solvents. In other embodiments, the adhesive is hot melt coated. In other embodiments, the adhesive may be coated out of solids and then cured.

The article may be coated with an optional material to provide release from an intended substrate or adhesive layer. The release layer may not be necessary if the article has releasability without the coating, for example if the structure limits the adhesion to the adhesive and the base substrate inherently has releasable characteristics. A releasable coating may be coated on the base substrate prior to the deposition of the material to form the structure. This embodiment is useful if the deposited material is, itself, a releasable material as detailed above. In other embodiments, a releasable coating may be coated onto the sheet over the deposited material.

Suitable release coatings are known in the art for a desired adhesive. Examples of release coatings include silicone, solvent and solventless types, thermal cure and radiation cure types, condensation cure types and addition cure types, epoxide functional, acrylate functional, silanol functional types, silicone hydride functional types, and release modifiers, such as siloxanes. In specific embodiments, the release coating is silicone.

An upper substrate may be attached to the adhesive layer opposite the base substrate. The upper substrate may be any substrate, for example films, heat sinks, and silicon wafers. The adhesive serves to adhere the upper substrate to an intended adherend after removal of the article. For example, the upper substrate may serve as a tape backing for the adhesive when it is removed from the article. In certain embodiments, the upper substrate is ink receptive for printing opposite the adhesive layer.

In certain embodiments, the upper substrate is laminated to adhesive after the adhesive is microreplicated from the liner pattern. In other embodiments, the adhesive is prepared on the upper substrate, and the article is then contacted to the adhesive opposite the upper substrate.

These articles may be used as carrier webs to carry another layer or article, for example as release liners for adhesive products forming an adhesive article. Some adhesive articles additionally comprise an upper substrate opposite the article. In certain embodiments, the adhesive article may be a transfer tape or a roll of tape, wherein no upper substrate is required.

In certain embodiments, the upper substrate is imaged. The substrate can be imaged using any commercial technique, including electrography, inkjet, screen printing, flexography, electronic cutting, or other imaging or graphic techniques on a major surface opposite the adhesive.

Examples

The following examples further disclose embodiments of the invention.
Evaluation Tests:
Analysis of Topography: Surface topography was evaluated using a Jena Jenavert incident light microscope and a WYKO Optical Profiler interferometer on representative spots of the surfaces.
Liner Release: A sample about 5 cm×7.5 cm was cut and the film/PSA laminate was peeled by hand from the liner. The ease of release from the liner was rated on the following scale:
  Fail 1: tear of paper base, paper split and remained on PSA layer, or cohesive split of PSA onto PET base.
  Fail 2: removed cleanly, but difficult to peel off
  Pass 3: moderate peel force
  Pass 4: easy removal
Application Test: After removal of liner, the adhesive sample from the Liner Release Test was placed with the PSA face down onto a flat painted aluminum panel. A 7.6 cm wide×6.0 cm diameter, 1226 g rubber roller was used to roll down about 1 cm wide area along the periphery of the sample. Finger pressure was used to press the sample from the adhered edges toward the center of the sample and then to press on the bubbles and air pockets at the center of the sample to evaluate the time required to press out the bubbles and entrapped air pockets. The results were rated as follows:
  Fail: Air bubbles and pockets could not be pressed out.
  Pass: Air bubbles and pockets were pressed flat. The approximate time to press out the bubbles and pockets is reported in seconds
Adhesion Test: The samples applied in the Application Test were peeled off of the flat panel. The adhesion was rated as follows:
  Fail 1: Extremely low adhesion, low force required
  Pass 2: Adhered on panel
  Pass 3: More aggressive adhesion to panel Base Substrates for Liners:
Paper: Clay coated 78 pounds (per 3000 square feet ream) kraft paper, nominal 4.4 mil thickness (Boise)
PET: Smooth, glossy, clear, colorless polyethylene terephthalate film nominal 4 mil thickness (Scotchpar™ Brand polyester film, 3M)
Deposited Materials:
Piezo Ink: UV curable ink for the 3M Printer 2500UV for Scotchprint™ Graphics, cured with the same printer.
Epoxy: To 100 parts of Epon™ Resin 160 (Shell) having a measured Brookfield Model LVDT viscosity of 84,300 cps at 6 rpm was added 1 part of FX-512 UV Activated Epoxy Curative (3M). The base sheets having the printed material were processed using an American Ultraviolet Company UV Processor having two banks of medium pressure UV lamps.
Release Type: A mixture of 96 parts of RAD-1007F Release Coating (FCC Technologies) and 4 parts of Cab-O-Sil M5 silica (Cabot Corporation) was prepared. The base sheets having the printed material were processed with the UV Processor described above.
Adhesive Coating and Film Lamination:
PSA A: copolymer of 90:10 weight ratio of iso-octyl acrylate and acrylic acid as a 23% solids solution in 60:40 by weight ratio of ethyl acetate and heptane and having a thermal crosslinker added.
PSA B: a copolymer of 93:7 weight ratio of iso-octyl acrylate and acrylic acid as a 25% solids solution in 64:36 by weight ratio of ethyl acetate and heptane and having a thermal crosslinker added.

The pressure sensitive adhesive solution was coated onto the indicated liners using a notch bar coater set at nominal 7 mil wet gap followed by drying of the coated layer in a 71° C. oven for 10 minutes. This gave nominally a 1.1 mil thick PSA layer on a flat base substrate. 2 mil plasticized PVC having a prime layer was laminated to the exposed PSA to give the liner/PSA/film construction.

Examples 1 and 2 used a piezo printing process. A grid pattern with 15 lines per inch repeat pitch of continuous intersecting ridges of black photocurable ink was deposited and photocured onto the paper base and onto the PET base using 2 passes with a 3M Printer 2500UV for Scotchprint™ Graphics. The settings were 0.25 point, 726×600 dpi, 2 pass at 50% ink each pass, 33 inches per second, 100% black to give a 15 line per inch square grid at a 45 degree bias.

Example 1 used a paper base substrate. Analysis of topography showed essentially continuous, undulating firm ridges having an average width at the base of the paper of 263±15 microns and an average height of 18±6 microns. The ridge structure was resistant to rubbing with a fingernail. The microstructured base sheet was coated with a thin layer of tin catalyzed silicone formulation and oven cured at 104° C. for 2 minutes, followed by coating with PSA 13 and film lamination. The film backing/PSA sample was smoothly and easily removed from the liner. Analysis of topography showed removed-liner ridges having heights up to 25 microns with average widths of about 240 microns and PSA channels (in a grid pattern of channels corresponding to the pattern of the ridges on the liner) having depths down to 22 microns and average widths of about 260 microns. Evaluation results are shown in the table.

Example 2 used the PET base. Analysis of topography showed essentially continuous, undulating ridges having a width determined near the base of the film ranging from about 200 to 250 microns and an average height of 22±5 microns. The ridge structure was resistant to rubbing with a fingernail. The structured base was silicone coated as in Example 1 and coated with PSA A and laminated to film. Analysis of topography showed removed-liner ridges having heights up to 25 microns with average widths of about 235 microns and PSA channels (in a grid pattern of channels corresponding to the pattern of the ridges on the liner) having depths down to 21 microns and average widths of about 275 microns.

Examples 3, 4, 5, and 6 used a 305 mesh printing screen for printing intersecting lines at 20 lines per inch repeat pitch and defining a square grid pattern set at a 45 degree bias from the frame of the screen, about 45 micron wide filament, and about 45 micron wide openings. The lines in the screen were nominally 3 mil (75 microns wide). The base substrate was placed in contact under the screen, and the photocurable material was pressed over the screen firmly using a plastic or rubber squeegee. The printed sheets were processed using the UV Processor.

Example 3 used the epoxy photocurable material on paper base and two passes through the UV Processor at 58 feet per minute (UVA: 0.25 Joules per square centimeter for each pass) to make hard raised grid microstructure. The ridges were resistant to rubbing with a fingernail. Analysis of topography showed some ridges were 275 microns wide and up to 14 microns high. A thin layer of silicone was applied and cured on the microstructured base sheets as in Examples 1 and 2, followed by coating with PSA A and film lamination. Analysis of topography showed removed-liner ridges having heights up to 20 microns with average widths of about 240 microns and PSA channels (in a grid pattern of channels corresponding to the pattern of the ridges on the liner) having depths down to 15 microns and average widths of about 260 microns. A microscopy of the article can be found in FIG. 1.

Figure 2:
FIG. 2 is a digital images of the sample prepared in Example 4.

Example 4 used the same process of Example 3 to make hard ridges, but used PET as the base. The ridges were resistant to rubbing with a fingernail. Analysis of topography prior to silicone and adhesive coating showed continuous ridges that were 180 to 280 microns wide and heights up to 13 microns. After silicone and adhesive coating, analysis of topography showed removed-liner ridges having heights up to 13 microns with average widths of about 190 microns and PSA channels (in a grid pattern of channels corresponding to the pattern of the ridges on the liner) having depths down to 1 microns and average widths of about 250 microns. A microscopy of the article can be found in FIG. 2.

Example 5 used photocurable Release Type material on PET base and one pass through the UV Processor at 70 feet per minute (UVA: 0.245 Joules per square centimeter) to make hard microstructure. The ridges were resistant to rubbing with a fingernail. Analysis of topography showed continuous ridges having an average width determined near the base of the film of about 159 microns and heights ranging from 12 to 24 microns. The microstructured sheets were coated with a thin layer of tin catalyzed silicone formulation and oven cured as in Example 1, followed by coating with PSA A and film lamination. Analysis of topography showed removed-liner ridges having heights up to 19 microns with average widths of about 150 microns and PSA channels (in a grid pattern of channels corresponding to the pattern of the ridges on the liner) having depths down to 17 microns and average widths of about 180 microns.

Figure 3:
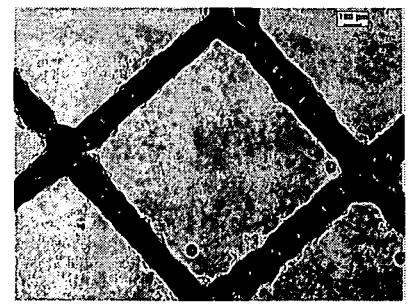
FIG. 3 is a digital images of the sample prepared in Example 5.

Example 6 repeated Example 5, except the thin layer of silicone was not coated onto the microstructured sheets prior to adhesive coating. Analysis of topography showed removed-liner ridges having heights up to 20 microns with average widths of about 210 microns and PSA channels (in a grid pattern of channels corresponding to the pattern of the ridges on the liner) having depths down to 24 microns and average widths of about 240 microns. A microscopy of the article can be found in FIG. 3.

Example 7 used epoxy photocurable material with a gravure printing process: A gravure printing plate was made by photochemical etching of magnesium alloy plate to provide a 20 line per inch square grid of intersecting continuous grooves. The grooves were about 80 microns wide at the top surface of the plate and about 38 microns deep. The epoxy photocurable material was spread into the grooves across the plate using a 12 inch wide rubber squeegee and the PET sheet was pressed against the plate using a 47 mm wide×37 mm diameter rubber roller. The sheet was peeled from the plate and processed twice through the UV Processor at 55 feet per minute (UVA: 0.30 Joules per square centimeter per pass) to afford hard microstructured surface. The ridges were resistant to rubbing with a fingernail. After silicone and adhesive coating, analysis of topography showed removed-liner ridges having heights up to 13 microns with average widths of about 250 microns and a grid pattern of channels in the PSA surface corresponding to the pattern of the ridges on the liner with average widths of about 250 microns.

| | Printing | Photocurable Material | Sheet Substrate | Top Layer of Silicone Release Applied? | PSA | Liner Release | Application Test Time (seconds) | Adhesion Rating |
|---|---|---|---|---|---|---|---|---|
| Comparative Example | | | | | | | | |
| 1C | None | None | Paper | No | A | Fail 1 (paper tore) | — | — |
| 2C | None | None | PET | No | A | Fail 1 (cohesive split of PSA) | — | — |
| 3C | None | None | Paper | Yes | A | Pass 4 | Fail | Pass 3 |
| 4C | None | None | PET | Yes | A | Pass 4 | Fail | Pass 3 |
| Example | | | | | | | | |
| 1 | Piezo | Ink | Paper | Yes | B | Pass 4 | Pass <5" | Pass 3 |
| 2 | Piezo | Ink | PET | Yes | A | Pass 4 | Pass 7" | Pass 3 |
| 3 | Screen | Epoxy | Paper | Yes | A | Pass 4 | Pass <5" | Pass 3 |
| 4 | Screen | Epoxy | PET | Yes | A | Pass 4 | Pass 7" | Pass 3 |
| 5 | Screen | Release Type | PET | Yes | A | Pass 4 | Pass 5" | Pass 2 |
| 6 | Screen | Release Type | PET | No | A | Pass 3 | Pass 10" | Pass 2 |
| 7 | Plate | Epoxy | PET | Yes | A | Pass 4 | Pass 15" | Pass 3 |

Examples 8, 9, 10, and 11 used similar screen printing processes and screen patterns described in Examples 3 through 6. Additionally, screens of 230 and 355 mesh were used. The 230 mesh screen had about 55 micron wide filament and about 55 micron wide openings. The 355 mesh screen had about 35 micron wide filament and about 35 micron wide openings.

Example 8. A photohardenable mixture of polyester hexaacrylate and polycaprolactone similar to those disclosed in U.S. Pat. Nos. 5,591,786 and 5,635,545 was warmed to a soft liquid paste and pressed over the 305 mesh screen by hand using a plastic squeegee to print onto the paper base. This provided a raised 20 line per inch grid of discontinuous ridges. The ridges were about 90 microns wide and about 19 microns high.

Example 9. Example 8 was repeated using a solventless PVC plastisol. This provided 20 line per inch grid of continuous ridges of soft, unfused plastisol. The ridges were about 16 microns high.

Example 10. Example 8 was repeated using the epoxy formulation described above. The printed sheet was passed twice through the UV Processor at 0.184 Joules per square centimeter UVA dose per pass. A 20 line per inch square grid pattern of continuous cured hard ridges was formed. The ridges were about 135 to 155 microns wide and 13 to 19 microns high. The other screens were also used to give continuous ridges.

Example 11. To 80 g of 3M 9720 clear UV curable ink was slowly added with stirring 3 g of Aerosil R202 (Degussa) hydrophobic amorphous coated silicone powder to afford a shear thinning formulation. The Brookfield LV viscosities using #4 spindle were:

>10,000 cps at 60 RPM
19,800 cps at 30 RPM
39,250 cps at 12 RPM
62,500 cps at 6 RPM The screen printing and exposure process of Example 10 was used to give a microstructured sheet. Exposure for each pass was 0.179 Joules per square centimeter UVA dose. The results for each screen are shown in the following table.

|  | Ridge Continuity | Ridge Width (microns) | Ridge Height (microns) |
| --- | --- | --- | --- |
| 230 Screen | continuous | 160 | 15–18 |
| 305 Screen | continuous | 125–150 | 20–25 |
| 355 Screen | discontinuous | 50–70 | up to 12 |

Example 12. The epoxy formulation was printed onto the paper using the patterned metal plate and a gravure proof press (Grav-A-Pruf, C&G Machine Co., Inc., South Hadley, Mass.). A grid of continuous ridges was transferred to the paper in regions where sufficient blade pressure had pressed the paper against the plate.

Example 13. A piece of 180 Series Controltac™ Graphic Marking System film (adhesive-backed PVC film product from 3M) was cleanly and easily removed from its silicone coated release liner and the piece was adhered onto the indicated substrates at room temperature using the edge of a PA-1 flat plastic squeegee (3M) to firmly press the piece onto the substrate. After about 15 seconds, the piece was pulled back from the substrate at a rate of at least about 20 cm per minute. The results show the non-release properties of the substrates tested and destruction of film and/or substrate.

Polyester base sheet: adhered film was difficult to peel off and tore.

Paper base sheet: Top layer of paper peeled off onto adhesive layer.

Paper business card: Top layer of card peeled off onto adhesive layer.

Various modifications and alterations of the present invention will become apparent to those skilled in the art without departing from the spirit and scope of the invention.

What is claimed is:

1. A method of manufacturing an article comprising
providing a base substrate having a first major surface and a second major surface opposite the first major surface; and
depositing a material on at least a portion of the first major surface of the base substrate as a defined pattern of structures to form a structured surface, the structured surface comprising a pattern of triangles, squares, rectangles, diamonds, hexagons or combinations thereof;
wherein the defined pattern comprises at least one continuous structure from one edge of the base substrate to a second edge of the base substrate, wherein the height of the material over the average plane of the first surface of the sheet is at least 3 micrometers and is less than 45 micrometers, and wherein the base substrate with material deposited on at least a portion of the first major surface comprises a microstructured release liner.

2. The method of claim 1 wherein the material is deposited by screen printing the material on the first major surface of the sheet.

3. The method of claim 1 wherein the material is deposited by gravure printing the material on the first major surface of the sheet.

4. The method of claim 1 wherein the material is deposited by ink-jet printing the material on the first major surface of the sheet.

5. The method of claim 1 wherein the material is deposited by thermography printing.

6. The method of claim 1 comprising exposing the article to thermal processing after depositing the material on the first major surface of the sheet.

7. The method of claim 1 comprising exposing the article to electromagnetic radiation after depositing the material on the first major surface of the sheet.

8. The method of claim 1 comprising exposing the article to particle radiation after depositing the material on the first major surface of the sheet.

9. The method of claim 1 comprising coating an adhesive layer over the deposited material of the release liner.

10. The method of claim 9 further comprising removing the adhesive layer from the release liner resulting in a structure pattern the inverse of the structured surface of the release liner.

11. The method of claim 10 wherein the deposited material on the release liner maintains its shape upon removal of the adhesive layer.

* * * * *